United States Patent
Rune et al.

(10) Patent No.: US 6,829,482 B2
(45) Date of Patent: Dec. 7, 2004

(54) SWITCHING FROM DEDICATED TO COMMON CHANNELS WHEN RADIO RESOURCES ARE CONTROLLED BY DRIFT RADIO NETWORK

(75) Inventors: Göran Rune, Linköping (SE); Gert-Jan Van Lieshout, Apeldoorn (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 578 days.

(21) Appl. No.: 09/854,846

(22) Filed: May 15, 2001

(65) Prior Publication Data
US 2002/0025815 A1 Feb. 28, 2002

Related U.S. Application Data
(60) Provisional application No. 60/204,588, filed on May 16, 2000.

(51) Int. Cl.[7] .................................................. H04Q 7/20
(52) U.S. Cl. ...................... 455/442; 455/525; 455/560; 370/331
(58) Field of Search ............................... 455/436, 438, 455/439, 442, 525, 524, 560; 370/331, 349, 352, 395.5, 522

(56) References Cited

U.S. PATENT DOCUMENTS

| | | |
|---|---|---|
| 4,979,168 A | 12/1990 | Courtois et al. |
| 5,319,638 A | 6/1994 | Lin |
| 5,379,446 A | 1/1995 | Murase |

(List continued on next page.)

FOREIGN PATENT DOCUMENTS

| | | |
|---|---|---|
| EP | 0 472 511 A2 | 2/1992 |
| EP | 0 898 438 A2 | 2/1999 |
| EP | 0 989 765 A | 3/2000 |
| WO | 95/08898 | 3/1995 |
| WO | 95/15665 | 6/1995 |
| WO | 95/20865 | 8/1995 |
| WO | 95/35637 | 12/1995 |
| WO | 98/24199 | 6/1998 |
| WO | 98/29975 A | 7/1998 |
| WO | 99 41850 A2 * | 8/1999 ........... H04B/7/005 |
| WO | 99/45736 | 9/1999 |
| WO | 99/52307 A | 10/1999 |
| WO | 00/21319 A1 | 4/2000 |
| WO | 00/35226 | 6/2000 |
| WO | 00/54521 A2 | 9/2000 |
| WO | 01/30107 A2 | 4/2001 |

OTHER PUBLICATIONS

U.S. patent application Ser. No. 09/035,821 filed Mar. 6, 1998, entitled "Telecommunications Inter–Exchange Measurement Transfer".

Primary Examiner—Nguyen T. Vo
Assistant Examiner—Bryan Fox
(74) Attorney, Agent, or Firm—Nixon & Vanderhye, P.C.

(57) ABSTRACT

A serving radio network controller (SRNC) of a radio access network assigns one or both of an appropriate temporary identifier (C-RNTI) and radio resources to a connection which is switched from a dedicated channel to a common channel in a cell handled by a drift radio network controller (DRNC). In one embodiment, the appropriate temporary identifier (C-RNTI) and the radio resources are obtained by the serving radio network controller (SRNC) upon execution of a channel switching process (e.g., when it has been determined that a connection should be switched from a dedicated channel to a common channel). In another embodiment of the invention, the serving radio network controller (SRNC) can obtain the appropriate temporary identifier (C-RNTI) and the radio resources prior to an actual channel switch operation. In both embodiments, the obtaining of the temporary identifier and/or radio resources can be part of a Common Transport Channel Resources Initialization procedure.

32 Claims, 8 Drawing Sheets

U.S. PATENT DOCUMENTS

| | | | |
|---|---|---|---|
| 5,495,480 | A | 2/1996 | Yoshida |
| 5,497,504 | A | 3/1996 | Acampora et al. |
| 5,517,674 | A | 5/1996 | Rune |
| 5,530,917 | A | 6/1996 | Andersson et al. |
| 5,708,656 | A | 1/1998 | Noneman et al. |
| 5,729,534 | A | 3/1998 | Jokinen et al. |
| 5,754,541 | A | 5/1998 | Glisic et al. |
| 5,757,772 | A | 5/1998 | Thornberg et al. |
| 5,778,175 | A | 7/1998 | Paul et al. |
| 5,793,747 | A | 8/1998 | Kline |
| 5,796,722 | A | 8/1998 | Kotzin et al. |
| 5,859,853 | A | 1/1999 | Carlson |
| 5,901,147 | A | 5/1999 | Joffe |
| 5,903,840 | A | 5/1999 | Bertacchi |
| 5,918,182 | A | 6/1999 | Korus et al. |
| 5,940,762 | A | 8/1999 | Lee et al. |
| 6,131,030 | A * | 10/2000 | Schon et al. ................ 455/438 |
| 6,233,222 | B1 | 5/2001 | Wallentin |
| 2001/0036823 | A1 * | 11/2001 | Van Lieshout et al. ..... 455/418 |

OTHER PUBLICATIONS

3GPP TS 25.211, v.3.2.0 "Physical Channels and Mapping of Transport Channels Onto Physical Channels (FDD)", Mar. 2000.

3GPP TS 25.221, v.3.2.0 "Physical Channels and Mapping of Transport Channels Onto Physical Channels (TDD)", Mar. 2000.

3GPP TS 25.331, v.3.2.0 "RRC Protocol Specification".

3GPP TS 25.423, v.3.1.0 "UTRAN Iur Interface RNSAP Signaling", Mar. 2000.

U.S. patent application Ser. No. 09/429,497, filed Oct. 28, 1999, entitled Channel–Type Switching To A Common Channel Based On Common Channel Load.

U.S. patent application Ser. No. 09/457,141, filed Dec. 8, 1999, entitled "Channel–Type Switching Control".

U.S. patent application Ser No.09/537,689, filed Mar. 29, 2000, entitled "Channel–Type Switching Based On Cell Load".

Cheung, et al, "Network Configurations for Seamless Support of CDMA Soft Handoffs Between Cell–Clusters", Dept. of Electrical Engineering, The University of British Columbia, 0–7803–3300–4/96 ©1996, pp. 295–299.

Jones, et al., IS–634 revision A—part 1 (IS–634.1 rev A) (PN–3539) 2nd Ballot Version—Draft for V&V, Part 1—Common Protocol and Part 5—Protocol Details, Oct. 27, 1997.

"Digital Cellular Telecommunications System (Phase 2+); Mobile Application Part (MAP) Specification (GSM 09.02 version 5.8.0)", European Telecommunications Standard Institute; Draft pr ETS 300 974, Feb. 1998.

"Cellular Radiotelelcommunications Intersystem Operations", ANSI–41–D (Former (TIA/EIA IS–41–C), pp. 2–5—2–14, 2–25—2–30.

* cited by examiner

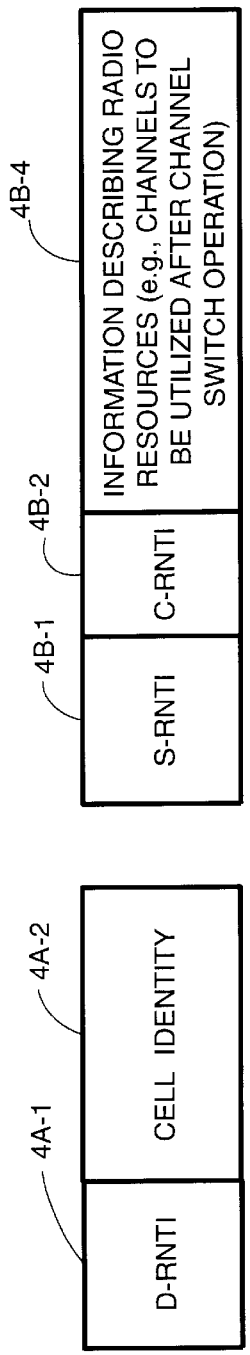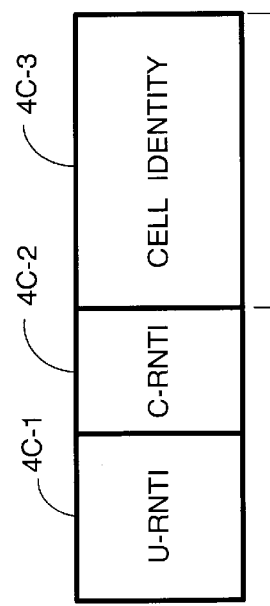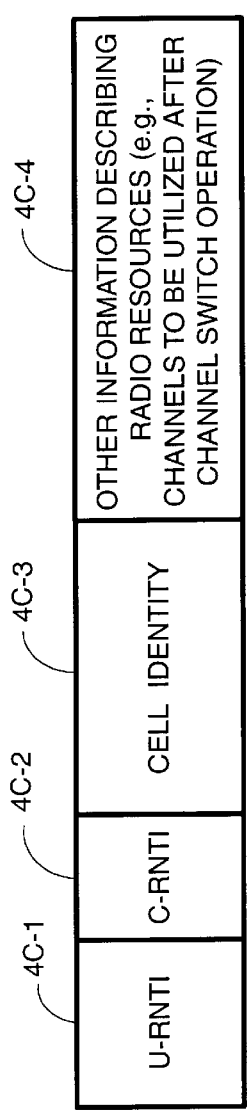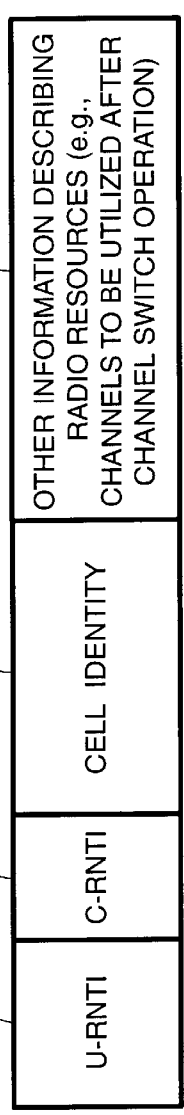
Fig. 4B
Fig. 4C-2
Fig. 4C-1
Fig. 4A

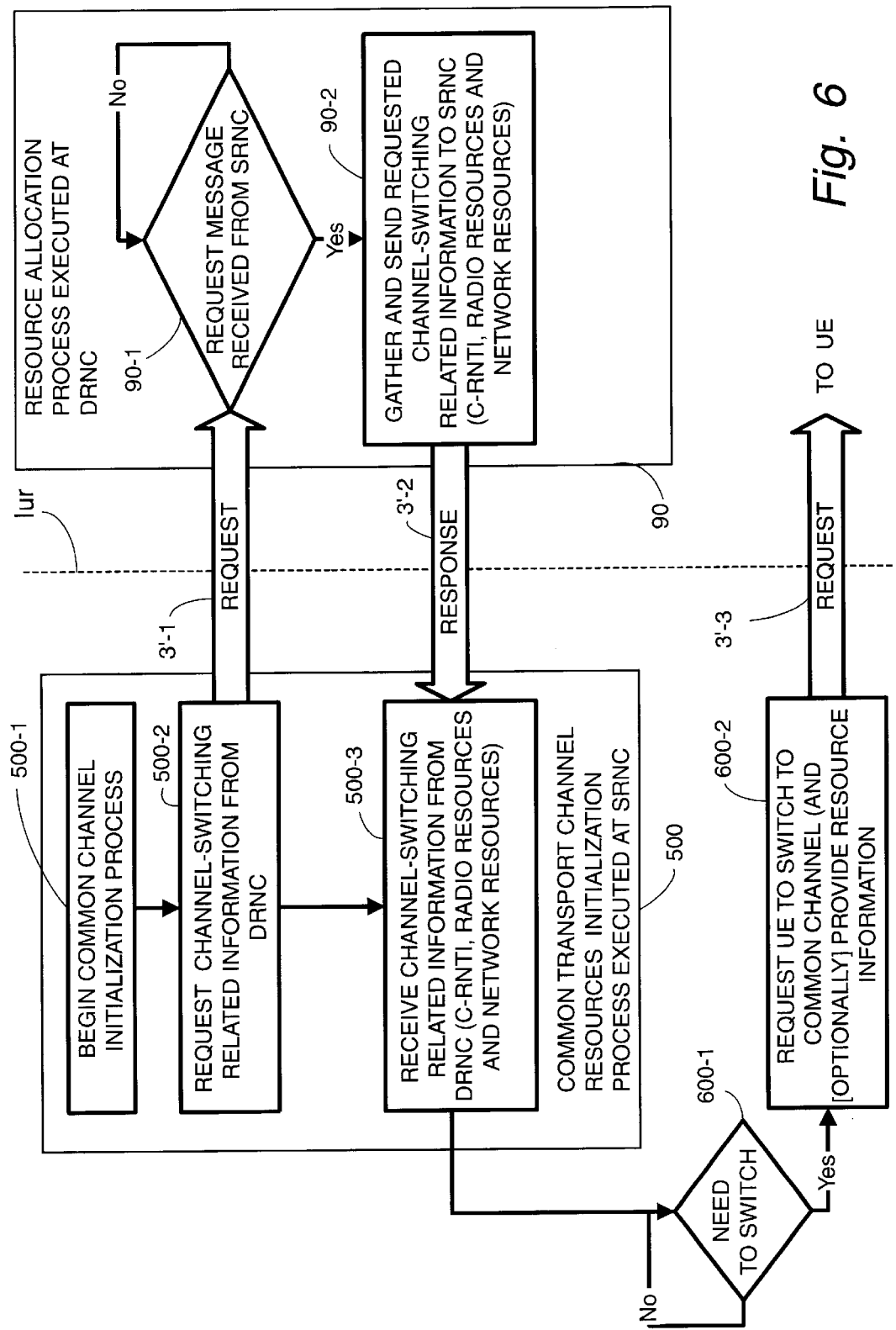

SWITCHING FROM DEDICATED TO COMMON CHANNELS WHEN RADIO RESOURCES ARE CONTROLLED BY DRIFT RADIO NETWORK

This application claims the benefit of provisional application Ser. No. 60/204,588 filed May 16, 2000.

BACKGROUND

1. Field of the Invention

The present invention pertains to telecommunications, and particularly to the switching from dedicated to common channels in a wireless telecommunications system.

2. Related Art and other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks)

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or the "Uu interface". In some instances, a connection involves both a Serving or Source RNC (SRNC) and a target or drift RNC (DRNC), with the SRNC controlling the connection but with one or more diversity legs of the connection being handling by the DRNC (see, in this regard, U.S. patent application Ser. No. 09/035,821 filed Mar. 6, 1998, entitled "Telecommunications Inter-Exchange Measurement Transfer"; and U.S. patent application Ser. No. 09/035,788 filed Mar. 6, 1998, entitled "Telecommunications Inter-Exchange Congestion Control", both of which are incorporated herein by reference). The interface between a SRNC and a DRNC is termed the "Iur" interface.

The Universal Mobile Telecommunications (UMTS) has both common transport channels and dedicated transport channels. The common transport channels are the random access channel (RACH), the forward access channel (FACH), the common packet channel (CPCH), and the downlink shared channel (DSCH). The dedicated transport channels include the dedicated channel (DCH). These transport channels are described, e.g., in one or more of the following three specifications:

(1) 3GPP TS 25.211, v.3.2.0 "Physical Channels and Mapping of Transport Channels Onto Physical Channels (FDD)".
  (2) 3GPP TS 25.221, v.3.2.0 "Physical Channels and Mapping of Transport Channels Onto Physical Channels (TDD)".
  (3) 3GPP TS 25.331, v.3.2.0 "RRC Protocol Specification".

In the foregoing, "3GPP" refers to a project known as the Third Generation Partnership Project (3GPP), which has undertaken to evolve further the UTRAN and GSM-based radio access network technologies.

From a resource management point of view, the downlink shared channel (DSCH) is managed by the network (UTRAN) in a similar way as the dedicated channel (DCH). Thus, from the resource management point of view, the downlink shared channel (DSCH) is essentially a dedicated resource. Accordingly, as used herein, a "common channel" is any one of the common transport channels excluding the downlink shared channel (DSCH), and a "dedicated channel" herein means dedicated transport channels and the downlink shared channel (DSCH).

On various occasions, it may be necessary or desirable to switch from a common channel to a dedicated, or conversely from a dedicated channel to a common channel, using what has been termed "channel switching". Various techniques for channel switching are described in the following United States Patent Applications, all of which are incorporated herein by reference: U.S. patent application Ser. No. 09/429,497 (attorney reference 2380-150), filed Oct. 28, 1999, entitled "Channel-Type Switching To A Common Channel Based On Common Channel Load"; U.S. patent application Ser. No. 09/457,141 (attorney reference 2380-165), filed Dec. 8, 1999, entitled "Channel-Type Switching Control"; U.S. patent application Ser. No. 09/537,689, filed Mar. 29, 2000, entitled "Channel-Type Switching Based On Cell Load".

When switching a connection from common channels to dedicated channels in UMTS, the network (UTRAN) selects the radio resources. Furthermore, in order to request that the user equipment unit (UE) switch to the selected dedicated channels, the network (UTRAN) sends information describing the selected resources to the user equipment unit (UE) using certain signaling messages in a physical channel reconfiguration procedure, as described, e.g., in 3GPP TS 25.331, v.3.2.0 "RRC Protocol Specification". In the context of this particular switch, the radio resources are the physical channel and transport channel resources for the dedicated transport channels (DCH) and/or downlink shared channel (DSCH) to be employed. The physical channel resources are those such as uplink DPCH, downlink DPCH, and/or downlink physical DSCH. For a definition of these channels and more detailed information, see, e.g., 3GPP TS 25.211, v.3.2.0 "Physical Channels and Mapping of Transport Channels Onto Physical Channels (FDD)" or 3GPP TS 25.221, v.3.2.0 "Physical Channels and Mapping of Transport Channels Onto Physical Channels (TDD)".

When switching from dedicated channels to common channels in UMTS, on the other hand, there are two different or alternative ways of assigning radio resources to be used by a user equipment unit (UE). In the context of this type of channel switching, the radio resources are the physical channel and transport channel resources for the common transport channels RACH, FACH, and/or CPCH (but not including the downlink shared channel (DSCH)). The physical channel resources are those such as the primary CPICH, secondary CCPCH, and/or physical RACH. For a definition of these channels and more detailed information, again see, e.g., 3GPP TS 25.211, v.3.2.0 "Physical Channels and Mapping of Transport Channels Onto Physical Channels (FDD)" or 3GPP TS 25.221, v.3.2.0 "Physical Channels and Mapping of Transport Channels Onto Physical Channels (TDD)".

A first of the alternate ways of assigning radio resources when switching from dedicated channels to common channels in UMTS is to let the user equipment unit (UE) select the radio resources. When the user equipment unit (UE) is to switch to the common channels, the network sends information that the user equipment unit (UE) shall switch to common channel resources via signaling messages in accordance with a physical channel reconfiguration procedure (described, e.g., in 3GPP TS 25.331, v.3.2.0 "RRC Protocol Specification"). The user equipment unit (UE) then, as a result of receipt of the signaling message, enters a state know as the Cell_FACH state, in which the user equipment unit (UE) detects and reads the broadcast channel in the cell to find the radio resources to be utilized for the common channel (e.g., as in an RCC Connection Re-establishment" procedure. The UMTS provides certain rules which govern the selection of radio resources for this alternative, as described in 3GPP TS 25.331, v.3.2.0 "RRC Protocol Specification".

A second of the alternate ways of assigning radio resources when switching from dedicated channels to common channels in UMTS is for the network (UTRAN) to select the radio resources. When the user equipment unit (UE) is to switch to the common channels, the network sends information describing the network-selected resources to the user equipment unit (UE) via signaling messages in accordance with a physical channel reconfiguration procedure (described, e.g., in 3GPP TS 25.331, v.3.2.0 "RRC Protocol Specification").

Moreover, regardless of whether the first or second alternatives described above are implemented, when switching from dedicated to common channels in UMTS the user equipment unit (UE) is also assigned a temporary identifier known as C-RNTI. This temporary identifier, the C-RNTI, is valid in the cell where the user equipment unit (UE) utilizes resources, and is used to distinguish between different user equipment units (UEs) in that cell.

The current 3GPP proposals envision switching from common channels to dedicated channels regardless of whether the user equipment unit (UE) is in a cell controlled by the serving RNC (SRNC) or the drift RNC (DRNC). However, for switching from dedicated channels to common channels, the second alternative way summarized above (i.e., the alternative in which the network assigns the radio resources to be used) can be used, but only if the user equipment unit (UE) is in a cell under the control of the serving RNC (SRNC). In other words, if the user equipment unit (UE) is in a cell under the control of the drift RNC (DRNC) rather than the serving RNC (SRNC), it is not possible for the network to assign the radio resources to be used when switching from dedicated channels to common channels.

Thus, in the current 3GPP proposals there are restrictions upon switching from dedicated channels to common channels. These restrictions include the fact that the serving RNC (SRNC) cannot assign the necessary temporary identifier C-RNTI or the necessary radio resources to be used when requesting that the user equipment unit (UE) switch to common channels if the user equipment unit (UE) is in a cell under control of the drift RNC (DRNC) rather than the serving RNC (SRNC). The network not being able to assign a temporary identifier C-RNTI for the user equipment unit (UE) leads to longer signaling sequences between the user equipment unit (UE) and the network, and thus poor utilization of the radio spectrum, as well as additional delay, when switching from dedicated channels to common channels. In this regard, in this scenario the user equipment unit (UE) itself must obtain the temporary identifier C-RNTI by additional signaling between the user equipment unit (UE) and the network before continuing to communicate with the network. Further, the lack of information regarding which radio resources to use means that the user equipment unit (UE) needs both to detect and to read information about the radio resources on the broadcast channel in the cell before accessing the cell, and thus again incurring some additional delay when switching from dedicated channels to common channels.

What is needed, therefore, and an object of the present invention, is a technique whereby the network assigns radio resources to be utilized upon switching a connection, for a user equipment unit (UE) in a cell controlled by a drift RNC (DRNC), from dedicated channels to common channels.

BRIEF SUMMARY OF THE INVENTION

A serving radio network controller (SRNC) of a radio access network assigns an appropriate temporary identifier (C-RNTI) and (optionally) radio resources to a connection which is switched from a dedicated channel to a common channel in a cell handled by a drift radio network controller (DRNC). In one embodiment, the appropriate temporary identifier (C-RNTI) and the radio resources are obtained by the serving radio network controller (SRNC) upon execution of a channel switching process (e.g., when it has been determined that a connection should be switched from a dedicated channel to a common channel). In another embodiment of the invention, the serving radio network controller (SRNC) can obtain the appropriate temporary identifier (C-RNTI) and the radio resources prior to an actual channel switch operation. In both embodiments, the obtaining of the temporary identifier and/or radio resources can be part of (e.g., an extension to) a Common Transport Channel Resources Initialization procedure.

In a first mode of the invention, the serving RNC (SRNC) assigns: (1) the cell (controlled by the drift RNC (DRNC)) to be utilized by the connection involving the user equipment unit (UE) after the channel switch operation; and (2) the C-RNTI valid in the assigned cell. In the first mode, the user equipment unit (UE) selects the specific channel resources. In the second mode of the invention, the serving RNC (SRNC) assigns (1) the cell (controlled by the drift RNC (DRNC)) to be utilized by the connection involving the user equipment unit (UE) after the channel switch operation; (2) the C-RNTI valid in the assigned cell; and (3) the specific channel resources to be utilized by the connection in the assigned cell after the channel switch operation. Both modes are more advantageous than the prior art alternative of requiring the user equipment unit (UE) to perform a additional signaling towards the SRNC to acquire a valid C-RNTI in the cell it selects.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4A is a diagrammatic view of an example format of portions of a request message issued by a SRNC to a DRNC in connection with a channel switching process.

FIG. 4B is a diagrammatic view of an example format of portions of a response message issued by the DRNC to the SRNC in response to the request message of FIG. 4A.

FIG. 4C-1 is diagrammatic view of an example format of portions of a request message issued in a first mode of the invention by a SRNC to a UE in conjunction with a channel switching process.

FIG. 4C-2 is diagrammatic view of an example format of portions of a request message issued in a second mode of the invention by a SRNC to a UE in conjunction with a channel switching process.

FIG. 6 is a flowchart showing, in accordance with one embodiment of the invention, basic example steps performed by a Common Transport Channel Resources Initialization procedure of a serving radio network controller and certain responsive steps performed by a resource allocation process of a drift radio network controller.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
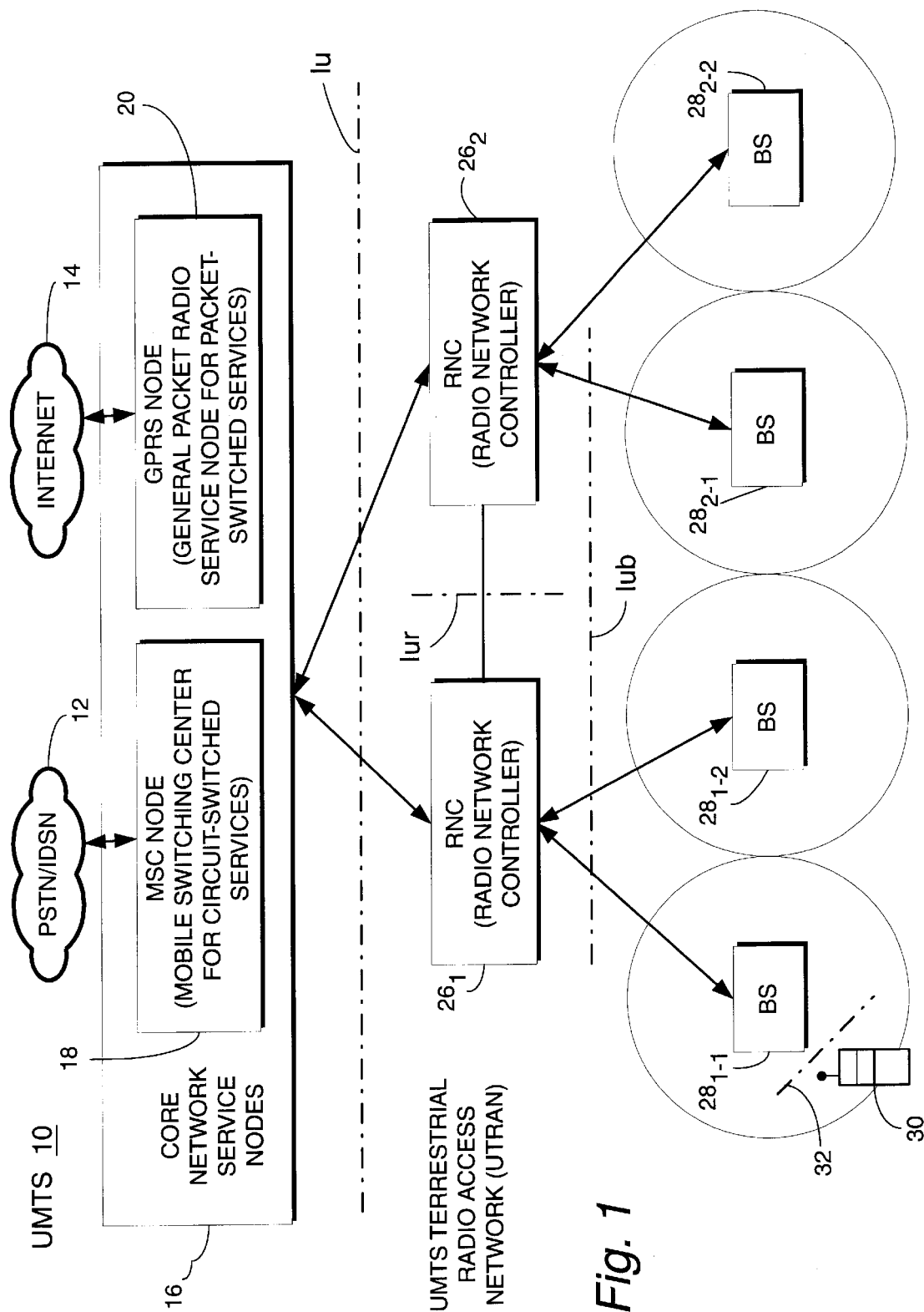
FIG. 1 is diagrammatic view of example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24.

A user equipment unit (UE), such as user equipment unit (UE) 30 shown in FIG. 1, communicates with one or more base stations (BS) 28 over a radio or air interface 32 (the "Uu interface"). Each of the radio interface Uu 32, the Iu interface, the Iub interface, and the Iur interface are shown by dash-dotted lines in FIG. 1.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of common control channels may exist between one of the base stations 28 and user equipment units (UEs) 30. For example, in the forward or downlink direction, there are several types of common control channels including a general broadcast channel (BCH), a paging channel (PCH), a common pilot channel (CPICH), and a forward access channel (FACH) for providing various types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications.

Traffic channels (TCH) may be allocated to carry substantive call communications with a user equipment unit (UE). If warranted or properly requested, a dedicated traffic channel (DCH) can be allocated for a connection with a user equipment unit (UE).

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE).

When a connection between the radio access network (RAN) and user equipment unit (UE) is being established, the radio access network (RAN) decides which RNC is to be the serving RNC (SRNC) and, if needed, which RNC is to be a drift RNC (DRNC). Normally, the RNC that controls the cell where the user equipment unit (UE) is located when the connection is first established is initially selected as the serving RNC (SRNC). As the user equipment unit (UE) moves, the connection is maintained by establishing radio communication branches or legs via new cells, possibly cells controlled by other RNCs. Those other RNCs become drift RNCs (DRNC) for RAN-UE connection.

Figure 1A:
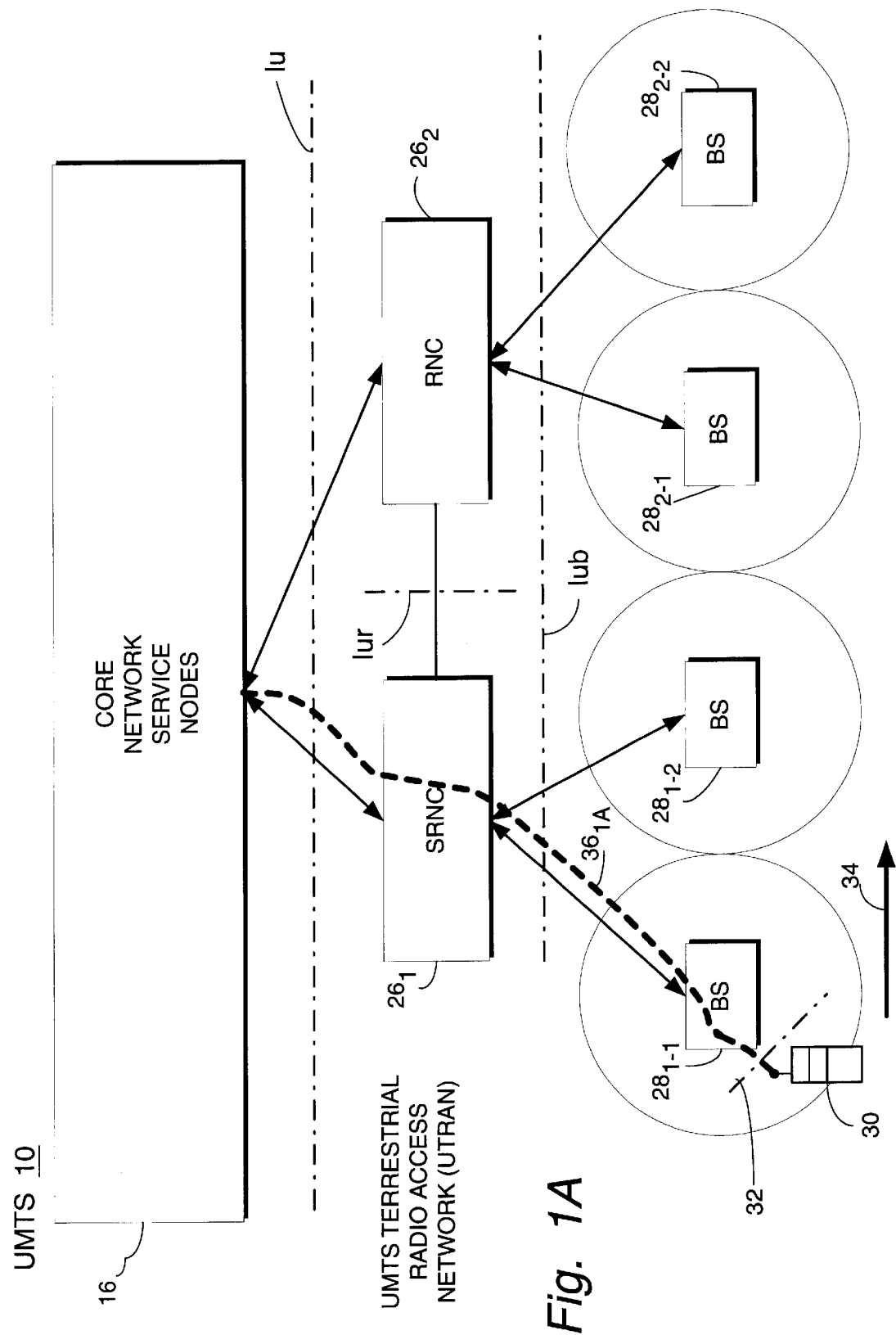
FIG. 1A is a diagrammatic view illustrating an example assignment of RNC roles for the system of FIG. 1 at setup of a connection with a user equipment unit (UE).

To illustrate the foregoing, and as a prelude to an explanation of the present invention, reference is made to the situation shown in FIG. 1A. FIG. 1A shows an example of RNC role assignment for user equipment unit (UE) 30 at initial setup of a connection involving user equipment unit (UE) 30. In FIG. 1A, radio network controller (RNC) $26_1$ acts as the serving RNC (SRNC) for the connection with user equipment unit (UE) 30, since user equipment unit (UE) 30 is in the cell controlled by base station (BS) $28_{1-1}$. The connection with user equipment unit (UE) 30 in FIG. 1A is shown by the broken line $36_{1A}$ (which extends from core network 16, through radio network controller (RNC) $26_1$, and base station (BS) $28_{1-1}$ to user equipment unit (UE) 30).

Figure 1B:
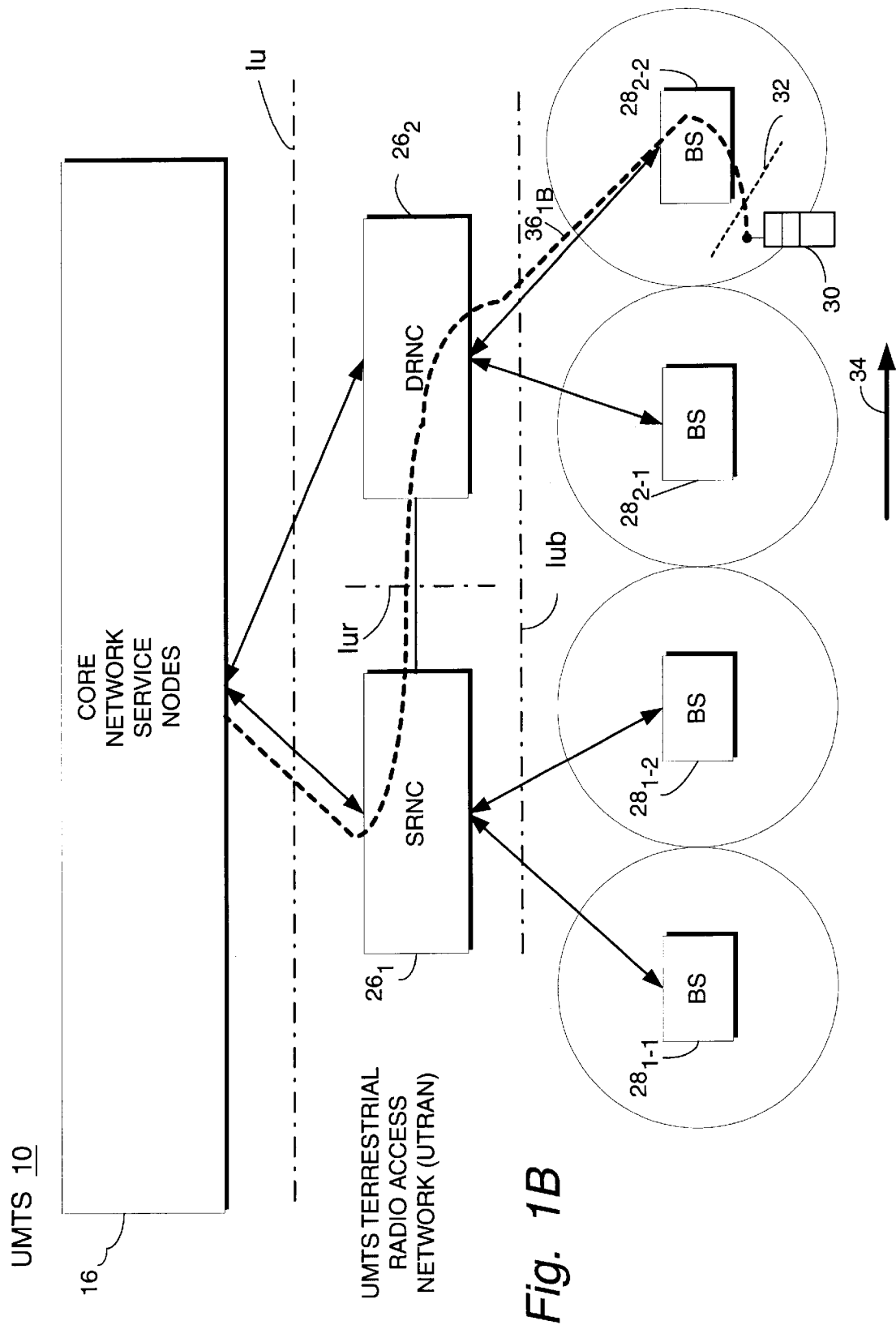
FIG. 1B is a diagrammatic view illustrating an example assignment of RNC roles after successive handovers of the connection with a user equipment unit (UE).

Suppose that user equipment unit (UE) 30 travels in the rightward direction indicated by arrow 34 in FIG. 1A, eventually leaving the cell controlled by base station (BS) $28_{1-1}$ and traveling successively through the cells controlled by respective base stations $28_{1-2}$, $28_{2-1}$, and $28_{2-2}$. As user equipment unit (UE) 30 enters a new cell, a handover occurs. The time at which user equipment unit (UE) 30 arrives at the cell controlled by base station $28_{2-2}$ is illustrated in FIG. 1B. At such time shown in FIG. 1B, radio network controller (RNC) $26_1$ still acts as the serving RNC (SRNC) for the connection to user equipment unit (UE) 30, while radio network controller (RNC) $26_2$ acts as the drift RNC (DRNC). In other words, radio network controller (RNC) $26_1$ still has control of the connection with user equipment unit (UE) 30, while radio network controller (RNC) $26_2$ supplies resources for the connection with respect to the cell in which user equipment unit (UE) 30 currently resides. The connection with user equipment unit (UE) 30 in FIG. 1B is shown by the broken line $36_{1B}$.

The present invention concerns the situation shown in FIG. 1B, in which the user equipment unit (UE) 30 is in a cell controlled by drift radio network controller (RNC) $26_2$, but in which the connection is controlled by the serving radio network controller (RNC) $26_1$. More particularly, for the situation illustrated in FIG. 1B, the present invention concerns the switching of the connection with user equipment unit (UE) 30 from dedicated channels to common channels, and the UMTS Terrestrial Radio Access Network (UTRAN) 24 assigning radio resources to be used for the connection with user equipment unit (UE) 30 after the channel switching.

In one embodiment of the invention hereinafter described primarily with reference to FIG. 2 and FIG. 3, the appropriate temporary identifier (C-RNTI) and the radio resources can be obtained by the serving radio network controller (SRNC) upon execution of a channel switching process (e.g., when it has been determined that a connection should be switched from a dedicated channel to a common channel). In an alternate embodiment described primarily with reference to FIG. 5 and FIG. 6, the serving radio network controller (SRNC) can obtain the appropriate temporary identifier (C-RNTI) and the radio resources prior to an actual channel switch operation. In both embodiments, the obtaining of the temporary identifier and/or radio resources can (but do not have to be) be part of (e.g., an extension to) a Common Transport Channel Resources Initialization procedure.

Figure 2:
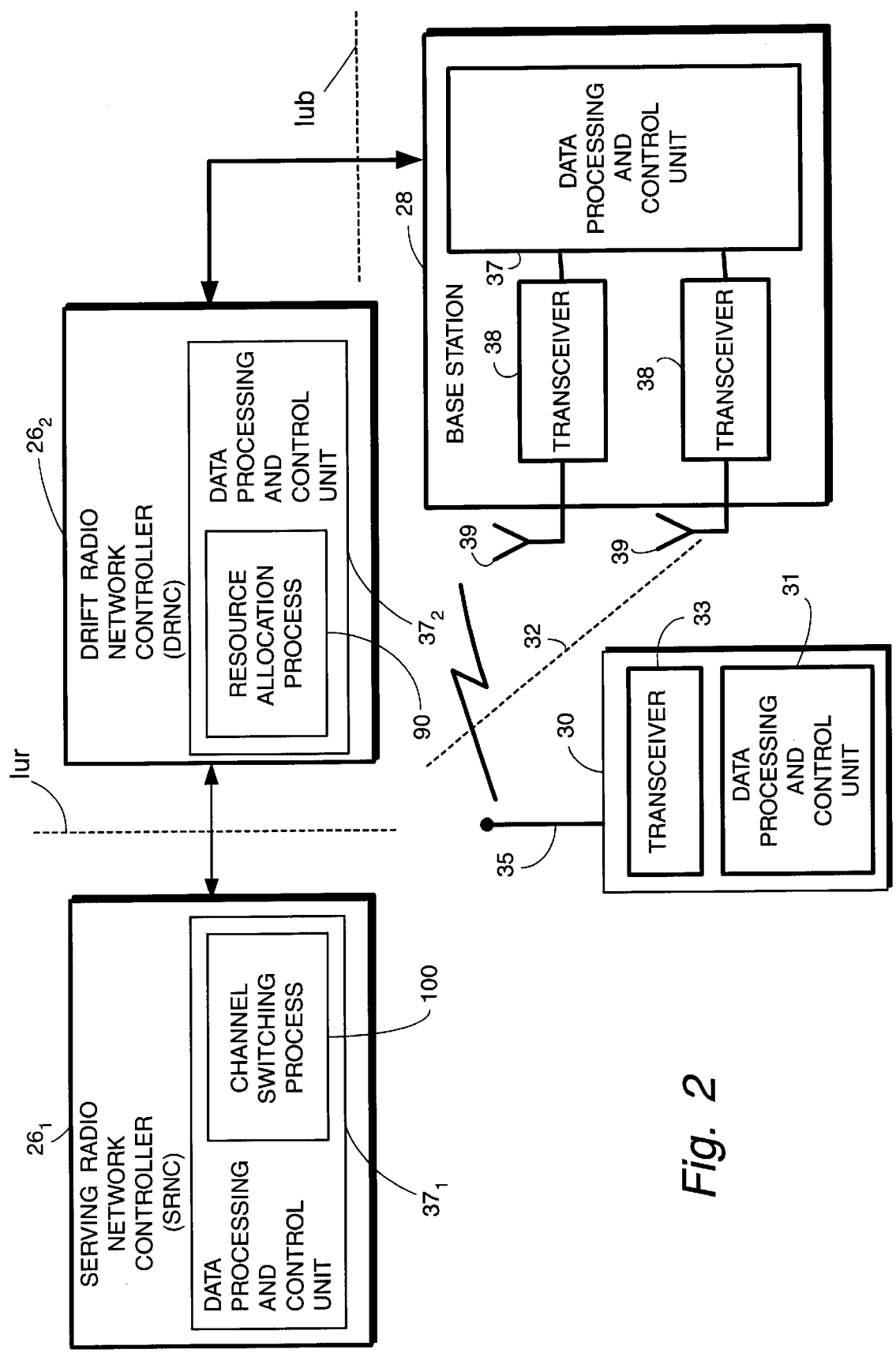
FIG. 2 is a simplified function block diagram of a portion of a UMTS Terrestrial Radio Access Network, including a user equipment unit (UE) station and a base station, along with a serving radio network controller (SRNC) executing a channel switching process in accordance with an embodiment of the invention and a drift radio network controller (DRNC) executing a responsive resource allocation process.
Figure 5:
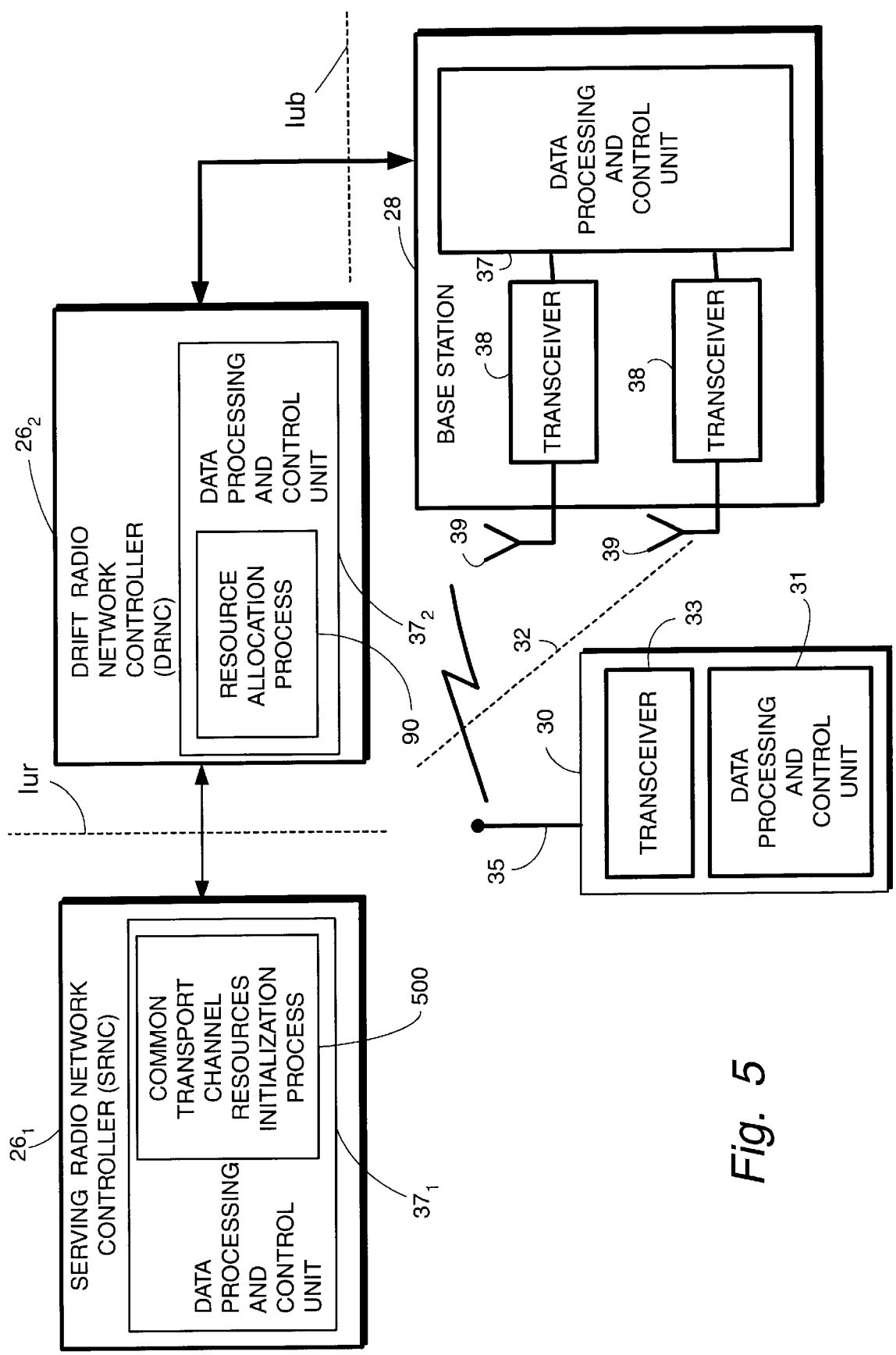
FIG. 5 is a simplified function block diagram of a portion of a UMTS Terrestrial Radio Access Network, including a user equipment unit (UE) station and a base station, along with a serving radio network controller (SRNC) executing a Common Transport Channel Resources Initialization procedure in accordance with an embodiment of the invention and a drift radio network controller (DRNC) executing a responsive resource allocation process.

FIG. 2 and FIG. 5 show selected general aspects of user equipment unit (UE) 30 and illustrative nodes such as base station 28 and radio network controller nodes, e.g., serving radio network controller (SRNC) $26_1$ and drift radio network controller (DRNC) $26_2$. The time shown in FIG. 2 and FIG. 5 is the same as that shown in FIG. 1B, i.e., with user equipment unit (UE) 30 being in a cell controlled by drift radio network controller (DRNC) $26_2$. The user equipment unit (UE) 30 shown in FIG. 2 and FIG. 5 includes a data processing and control unit 31 for controlling various operations required by the user equipment unit (UE). The UE's data processing and control unit 31 provides control signals as well as data to a radio transceiver 33 connected to an antenna 35.

The base station 28 as shown in FIG. 2 and FIG. 5 includes a base station data processing and control unit 37 for performing numerous radio and data processing operations required to conduct communications with drift radio network controller (DRNC) $26_2$ and with the user equipment units (UEs) 30. Part of the equipment controlled by the base station data processing and control unit 37 includes plural radio transceivers 38 connected to one or more antennas 39.

The example radio network controllers $26_1$ and $26_2$ as shown in FIG. 2 and FIG. 5 each have corresponding data processing and control unit $36_1$ and $36_2$, respectively, for performing numerous radio and data processing operations required to conduct communications with the base stations controlled thereby, as well as with each other. The data processing and control unit $36_2$ of drift radio network controller (DRNC) $26_2$, which is in charge of the radio resources in the cell in which user equipment unit (UE) 30 is currently located, executes a resource allocation process 90 for allocating the various common traffic channels and dedicated traffic channels managed by drift radio network controller (DRNC) $26_2$.

In the scenario shown in FIG. 1B, FIG. 2, and FIG. 5, serving radio network controller (SRNC) $26_1$ controls the connection with user equipment unit (UE) 30, but drift radio network controller (DRNC) $26_2$ manages the radio resources for the cells under its control, including the cell in which user equipment unit (UE) 30 is currently located. In accordance with the first example embodiment of FIG. 2, the data processing and control unit $36_1$ of serving radio network controller (SRNC) $26_1$ executes a channel switching process 100. Advantageously, channel switching process 100 enables serving radio network controller (SRNC) $26_1$ to assign radio resources to be utilized for the connection with user equipment unit (UE) 30 upon switching the connection from dedicated to common channels, even though user equipment unit (UE) 30 is in a cell controlled by drift radio network controller (DRNC) $26_2$. As used herein, terminology such as "radio resources" and "channel-switching related information" encompasses, e.g., (1) an implicit assignment or allocation of radio resources as may occur by specifying a particular cell to be utilized after the channel switch operation; and (2) an explicit assignment or allocation of radio resources such as specific channel(s) to be utilized after the channel switch operation (e.g., in addition to also possibly specifying the particular cell to be utilized after the channel switch operation). It should be recalled that a user equipment unit (UE) may be able to communication with or in several cells, and that a base station may serve plural cells from a single base station site.

The channel switching process 100 of the present invention involves certain signaling between serving radio network controller (SRNC) $26_1$ and drift radio network controller (DRNC) $26_2$, and particularly between channel switching process 100 and resource allocation process 90, over the Iur interface.

Figure 3:
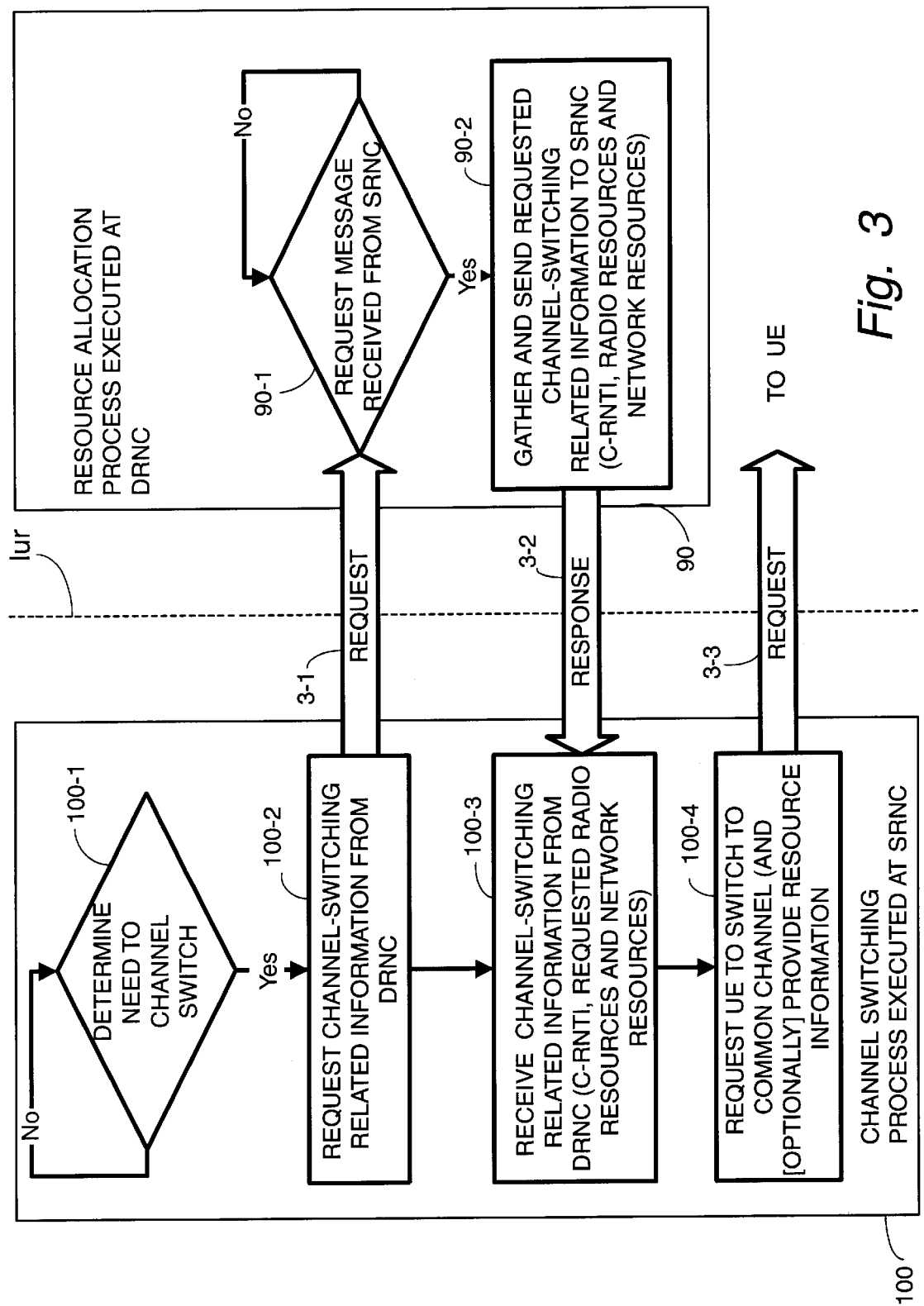
FIG. 3 is a flowchart showing, in accordance with one embodiment of the invention, basic example steps performed by a channel switching process of a serving radio network controller and certain responsive steps performed by a resource allocation process of a drift radio network controller.

Basic example steps performed by channel switching process 100 of serving radio network controller (SRNC) $26_1$, and certain responsive steps performed by resource allocation process 90 of drift radio network controller (DRNC) $26_2$, are illustrated in FIG. 3. As reflected by step 100-1, channel switching process 100 checks whether a connection should be switched from dedicated channels to common channels. The check of step 100-1 can be performed in any of several manners. In one example of how step 100-1 can be implemented, channel switching process 100 ascertains a decrease in the needed data transfer rate (e.g., due to low amounts of data to be sent to user equipment unit (UE) as measured by serving radio network controller (SRNC) $26_1$, or due to low amounts of data to be sent from the user equipment unit (UE) 30 as measured by and reported by user equipment unit (UE) 30). Such example is understood, for example, with reference to U.S. patent application Ser. No. 09/429,497 (attorney reference 2380-150), filed Oct. 28, 1999, entitled "Channel-Type Switching To A Common Channel Based On Common Channel Load" and U.S. patent application Ser. No. 09/457,141 (attorney reference 2380-165), filed Dec. 8, 1999, entitled "Channel-Type Switching Control".

The channel switching process 100 continues to loop back to step 100-1 as long as no connections require channel switching. But if it is determined at step 100-1 that a connection does require switching from a dedicated to a common channel, and that the connection is for a user equipment unit (UE) 30 in a cell controlled by drift radio network controller (DRNC) $26_2$, step 100-2 is next executed. At step 100-2, channel switching process 100 prepares and sends, to drift radio network controller (DRNC) $26_2$, a request message 3-1. The request message 3-1 has an example format generally shown in FIG. 4A. Upon receipt, request message 3-1 will prompt the drift radio network controller (DRNC) $26_2$ for certain channel-switching related information. In particular, request message 3-1 requests from drift radio network controller (DRNC) $26_2$ the following information for the connection for which a channel switch has been deemed necessary: (1) a temporary identifier (C-RNTI) allocated to the connection; (2) the radio resources and network resources which will be allocated in a specific cell to the connection when the connection is switched to the common channels. In order to elicit the requested information, request message 3-1 includes information elements including the example information elements 4A-1 and 4A-2 shown in FIG. 4A as being pertinent to the present invention. The information element 4A-1 is the D-RNTI which is used to identify the connection which is to be channel switched; the information element 4A-2 identifies the cell in which the user equipment unit (UE) 30 having the connection is located. The D-RNTI of information element 4A-1, and an information element S-RNTI mentioned subsequently, are utilized to express how the connection/UE is identified in drift radio network controller (DRNC) $26_2$ and serving radio network controller (SRNC) $26_1$, respectively, when communicating over the inter-RNC interface (e.g., the Iur interface).

FIG. 3 shows, as step 90-1, resource allocation process 90 awaiting receipt of the request message 3-1 issued as a result of channel switching process 100 performing step 100-2.

When the request message 3-1 is received at drift radio network controller (DRNC) 26₂, resource allocation process 90 performs step 90-2. Step 90-2 basically involves resource allocation process 90 gathering and sending the requested channel switching-related information to serving radio network controller (SRNC) 26₁ in the form of response message 3-2. An example format of response message 3-2 is shown in FIG. 4B as comprising information elements 4B-1 through 4B-2 and (optionally) information element 4B-4. The information element 4B-1 is the identifier of the UE context in serving radio network controller (SRNC) 26₁. The information element 4B-2 is the C-RNTI which drift radio network controller (DRNC) 26₂, and particularly resource allocation process 90, has allocated to the connection. The information element 4B-4, which is an optional information element employed in one mode of the invention, includes information describing the radio resources. In such mode of the invention, the information element 4B-4 describes a further aspect of the radio resources to be used by the connection after the switch to common channels, e.g., particular channels to be used by the connection after the channel switch operation.

The person skilled in the art understands how the resource allocation process 90 of drift radio network controller (DRNC) 26₂ ascertains the information to be used for each of the information elements of response message 3-2. For example, for one mode of the invention the Physical Channel Reconfiguration message in the RRC Protocol Specification (3GPP TS 25.331, v.3.2.0 "RRC Protocol Specification") and the procedure text governing its use include information that is required for the response message 3-2. In essence, the person skilled in the art can study the information the UE receives by detecting and reading the broadcast channel in the cell. On a high level the required information is thus information on the Physical RACH (PRACH), the RACH, the AICH, and the Primary CPICH. The mechanism to be used is to allocate resources from the configuration of the cell where the SRNC requests resources. The identifier S-RNTI has to be known in advance by the DRNC, which is the case in 3GPP since the UE is using dedicated resources and the procedures for those ensure that the DRNC has the S-RNTI valid for the UE available.

Step 100-3 of channel switching process 100 shows receipt at serving radio network controller (SRNC) 26₁ of the response message 3-2. Following the receipt at step 100-3 of response message 3-2, channel switching process 100 performs step 100-4. As step 100-4, channel switching process 100 issues a request 3-3 to the user equipment unit (UE) 30 involved with the channel switch-affected connection, the request of step 100-4 directing the user equipment unit (UE) 30 to switch to common channels. The request 3-3 issued as step 100-4 can, as an example in one mode of the invention, take the form of a "Physical Channel Reconfiguration" message as described in 3GPP TS 25.331, v.3.2.0 "RRC Protocol Specification". As a minimum, the request message 3-3 issued to user equipment unit (UE) 30 apprises the user equipment unit (UE) 30 of the C-RNTI allocated to the affected connection by drift radio network controller (DRNC) 26₂.

FIG. 4C-1 shows example information elements that can be included in the message 3-3 issued from channel switching process 100 to user equipment unit (UE) 30 in connection with the requested channel switch for a first mode of the invention. The information element 4C-1 includes the U-RNTI, which comprises the identity of serving radio network controller (SRNC) 26₁ and the S-RNTI, and which serves to explain how the connection/UE is identified in the user equipment unit (UE) and SRNC, respectively. The information element 4C-2 is the C-RNTI, which (as mentioned above, is the C-RNTI allocated to the affected connection by drift radio network controller (DRNC) 26₂. Further, the message 3-3 includes the information element 4C-3 which assigns the specific cell to be utilized by the user equipment unit (UE) as a result of the channel switch operation. In UMTS, the cell identifier of information element 4C-3 can be the primary scrambling code of the cell. By selecting and assigning the specific cell for the user equipment unit (UE), the serving RNC (SRNC) implicitly or indirectly allocates the radio resources of the drift RNC (DRNC). In the meaning of "radio resources" as used herein, by specifying the cell to be utilized by the connection involving the user equipment unit (UE) the serving RNC (SRNC) does (implicitly) allocate radio resources, and the cell identification is information regarding radio resources.

In a second mode of the invention, the serving radio network controller (SRNC) 26₁ uses the message 3-3 not only to allocate radio resources in the sense of cell selection, but also allocate radio resources by assigning the specified radio channels to be utilized by the connection in the assigned cell. In the message 3-3 of this second mode, illustrated in FIG. 4C-2, the information element 4C-4 contains further information (beyond mere cell identification) to be utilized by the connection after the switch. In this second mode of the invention, the information element 4C-4 includes, e.g., transport channels and physical channels to be used by the connection after the switch to common channels.

The information element 4C-4 of request message 3-3 issued to user equipment unit (UE) 30 is optional in the sense that user equipment unit (UE) 30 could ascertain the same information in other ways. For example, user equipment unit (UE) 30 could, if the optional information element 4C-4 is not provided, ascertain the radio resources to be utilized by detecting and reading information regarding the radio resources from the broadcast channel in the cell.

Thus, to some degree the embodiment shown in FIG. 2 and FIG. 3 is an extension of the Common Transport Channel Resources Initialization procedure of 3GPP TS 25.423, v.3.1.0 "UTRAN Iur Interface RNSAP Signaling", in which an initialization request (e.g., request message 3-1) includes the identity of the cell (e.g., comparable to information element 4A-2 in FIG. 4A) and an initiation response message (e.g., request message 3-2) includes the C-RNTI and information on the radio resources to be used (e.g., comparable to information element 4B-2 and 4B-4 respectively in FIG. 4B).

Another example of how step 100-1 of channel switching process 100 can be implemented is checking whether cell loading requires or militates toward switching a connection from dedicated channels to common channels. In such case, there would have to be additional signaling from drift radio network controller (DRNC) 26₂ to serving radio network controller (SRNC) 26₁ advising of the extent of cell loading, and thereby triggering of the channel switching.

It should be understood that essentially the same information included in the request message 3-1 and response message 3-2 of FIG. 3 can be conveyed in other contexts. For example, rather than awaiting for a determination of a need to channel switch such as occurs at step 100-1 of FIG. 3, essentially the same information can be elicited and supplied in advance in the context of a Common Transport Channel Resources Initialization procedure 500 as illustrated in FIG. 5 and FIG. 6.

Considering the Common Transport Channel Resources Initialization procedure 500 in further detail, when initializing a common channel having resources for the drift radio network controller (DRNC) 26₂ for use by serving radio network controller (SRNC) 26₁, as step 500-1 the serving radio network controller (SRNC) 26₁ can issue a request message 3'-1. Like the request message 3-1, receipt of the request message 3'-1 will prompt drift radio network controller (DRNC) 26₂ to transmit, e.g., the following information: (1) a temporary identifier (C-RNTI) to be allocated to a connection should there be a need to switch a connection from a dedicated channel to the common channel being initialized and (2) (for the second mode) the other radio resources and network resources which will be allocated for the common channel being initialized. Upon being interrogated by request message 3'-1, drift radio network controller (DRNC) 26₂ responds with response message 3'-2, essentially in the same manner as response message 3-2 in FIG. 3. With the information of request message 3'-1 and response message 3'-2 thus obtained in advance, when it is eventually determined by serving radio network controller (SRNC) 26₁ that a connection should be switched from dedicated channels to the common channels already initialized, the channel switch can be performed without having to interrogate the drift radio network controller (DRNC) 26₂ at that time.

In the above regard, assume that a need arises to change a particular connection from dedicated channels to common channels after the transmissions of request message 3'-1 and response message 3'-2 associated with the Common Transport Channel Resources Initialization procedure 500 of FIG. 5 and FIG. 6. Step 600-1 depicts the determination of the need to switch the particular connection from dedicated channels to common channels. Assuming that the common channel to which the connection is to be switched is one for which Common Transport Channel Resources Initialization procedure 500 has already been performed, the serving radio network controller (SRNC) 26₁ already knows the necessary information for requesting user equipment unit (UE) 30 to switch to the common channel. That is, serving radio network controller (SRNC) 26₁ already knows the C-RNTI allocated by drift radio network controller (DRNC) 26₂ (having received the C-RNTI in response message 3'-2). Therefore, serving radio network controller (SRNC) 26₁ can issue message 3'-3 to user equipment unit (UE) 30 without interrogation of drift radio network controller (DRNC) 26₂ after the determination of the need to channel switch.

Thus, the embodiment shown in FIG. 5 and FIG. 6 is an extension of the Common Transport Channel Resources Initialization procedure of 3GPP TS 25.423, v.3.1.0 "UTRAN Iur Interface RNSAP Signaling", in which an initialization request (e.g., request message 3'-1) includes the identity of the cell (e.g., comparable to information element 4A-2 in FIG. 4A) and an initiation response message (e.g., request message 3'-2) includes the C-RNTI and information on the radio resources to be used (e.g., comparable to information element 4B-2 and 4B-4 respectively in FIG. 4B).

In the scenarios in which the radio resource information is not provided by signaling from the serving RNC (SRNC), the user equipment unit (UE) can detect and read the broadcast channel in the cell to find the radio resources to be utilized for the common channel, e.g., as in an RCC Connection Re-establishment" procedure alluded to above.

In the first mode of the invention typified by the request message of FIG. 4C-1, the serving RNC (SRNC) assigns: (1) the cell (controlled by the drift RNC (DRNC)) to be utilized by the connection involving the user equipment unit (UE) after the channel switch operation; and (2) the C-RNTI valid in the assigned cell. In the first mode, the user equipment unit (UE) selects the specific channel resources. In the second mode of the invention typified by the request message of FIG. 4C-2, the serving RNC (SRNC) assigns (1) the cell (controlled by the drift RNC (DRNC)) to be utilized by the connection involving the user equipment unit (UE) after the channel switch operation; (2) the C-RNTI valid in the assigned cell; and (3) the specific channel resources to be utilized by the connection in the assigned cell after the channel switch operation. Both modes are more advantageous than the prior art alternative of requiring the user equipment unit (UE) to perform a additional signaling towards the SRNC to acquire a valid C-RNTI in the cell it selects.

The present invention provides a method that allows more efficient use of the radio spectrum when switching from dedicated channels to common channels in a radio access network such as the UMTS. The present invention also advantageously reduces the delay when switching from dedicated channels to common channels in the radio access network.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while nodes of the present invention have been illustrated for sake of example as being ATM-based nodes, it should be understood that the invention is not so limited, and that other communication protocols and/or cell structures can be utilized for communicating on an inter-node and intra-node bases.

What is claimed is:

1. A method of performing, for a telecommunications service, a channel switch operation whereby a connection is switched from a dedicated channel to a common channel, the connection being with a user equipment unit (UE) located in a cell controlled by a drift radio network controller (DRNC), the method comprising:

a serving radio network controller (SRNC) which controls the connection requesting a temporary identifier for the connection from the drift radio network controller (DRNC);

the serving radio network controller (SRNC) signaling the user equipment unit (UE) to switch from the dedicated connection to the common channel connection; and the serving radio network controller (SRNC) supplying the user equipment unit (UE) with the temporary identifier for the connection.

2. The method of claim 1, further comprising the serving radio network controller (SRNC) supplying the user equipment unit (UE) with information regarding radio resources.

3. The method of claim 2, wherein the information regarding radio resources specifies a particular cell to be utilized by the connection with the user equipment unit (UE) after the channel switch operation.

4. The method of claim 2, wherein the information regarding radio resources comprises specific channel(s) to be utilized by the connection with the user equipment unit (UE) after the channel switch operation.

5. The method of claim 4, further comprising the serving radio network controller (SRNC) requesting information regarding radio resources to be allocated by the drift radio network controller (DRNC) to the connection after the channel switch operation.

6. The method of claim 1, wherein the serving radio network controller (SRNC) requests the temporary identifier as part of a Common Transport Channel Resources Initialization procedure.

7. The method of claim 1, wherein the serving radio network controller (SRNC) requests the temporary identifier as part of a channel switching process when a determination has been made that a channel switch should occur.

8. A radio access network comprising:
   a serving radio network controller (SRNC);
   a drift radio network controller (DRNC);
   wherein the serving radio network controller (SRNC) executes a process to obtain from the drift radio network controller (DRNC) a temporary identifier for a connection involved in a channel switch operation, the connection being with a user equipment unit (UE);
   wherein the serving radio networks controller (SRNC) supplies the user equipment unit (UE) with the temporary identifier for the connection; and
   wherein the serving radio network controller (SRNC) requests the temporary identifier as part of a Common Transport Channel Resources Initialization procedure.

9. The apparatus of claim 8, wherein the serving radio network controller (SRNC) also supplies the user equipment unit (UE) with information regarding radio resources.

10. The apparatus of claim 9, wherein the information regarding radio resources comprises specific channel(s) to be utilized by the connection with the user equipment unit (UE) after the channel switch operation.

11. The apparatus of claim 10, wherein the process executed by the serving radio network controller (SRNC) also obtains from the drift radio network controller (DRNC) information regarding radio resources to be allocated by the drift radio network controller (DRNC) to the connection after the channel switch operation.

12. The apparatus of claim 9, wherein the information regarding radio resources specifies a particular cell to be utilized by the connection with the user equipment unit (UE) after the channel switch operation.

13. The apparatus of claim 8, wherein the serving radio network controller (SRNC) requests the temporary identifier as part of a channel switching process when a determination has been made that a channel switch should occur.

14. A radio access network comprising:
   a serving radio network controller (SRNC);
   a drift radio network controller (DRNC);
   wherein the serving radio network controller (SRNC) executes a process to obtain from the drift radio network controller (DRNC) a temporary identifier for a connection involved in a channel switch operation, the connection being with a user equipment unit (UE);
   wherein the serving radio network controller (SRNC) supplies the user equipment unit (UE) with the temporary identifier for the connection; and
   wherein the channel switch is from a dedicated channel to a common channel.

15. The apparatus of claim 14, wherein the serving radio network controller (SRNC) also supplies the user equipment unit (UE) with information regarding radio resources.

16. The apparatus of claim 15, wherein the information regarding radio resources comprises specific channel(s) to be utilized by the connection with the user equipment unit (UE) after the channel switch operation.

17. The apparatus of claim 16, wherein the process executed by the serving radio network controller (SRNC) also obtains from the drift radio network controller (DRNC) information regarding radio resources to be allocated by the drift radio network controller (DRNC) to the connection after the channel switch operation.

18. The apparatus of claim 15, wherein the information regarding radio resources specifies a particular cell to be utilized by the connection with the user equipment unit (UE) after the channel switch operation.

19. The apparatus of claim 14, wherein the serving radio network controller (SRNC) requests the temporary identifier as part of a channel switching process when a determination has been made that a channel switch should occur.

20. A method of performing, for a telecommunications service, a channel switch operation whereby a connection is switched from a dedicated channel to a common channel, the connection being with a user equipment unit (UE) located in a cell controlled by a drift radio network controller (DRNC), the method comprising:
   a serving radio network controller (SRNC) which controls the connection requesting information regarding radio resources to be allocated by the drift radio network controller (DRNC) to the connection after the channel switch operation;
   the serving radio network controller (SRNC) supplying the user equipment unit (UE) with the information regarding radio resources.

21. The method of claim 20, wherein the information regarding radio resources comprises specific channel(s) to be utilized by the connection with the user equipment unit (UE) after the channel switch operation.

22. The method of claim 20, wherein the information regarding radio resources specifies a particular cell to be utilized by the connection with the user equipment unit (UE) after the channel switch operation.

23. The method of claim 20, wherein the serving radio network controller (SRNC) requests the information regarding radio resources as part of a Common Transport Channel Resources Initialization procedure.

24. The method of claim 20, wherein the serving radio network controller (SRNC) requests the information regarding radio resources as part of a channel switching process when a determination has been made that a channel switch should occur.

25. A radio access network comprising:
   a serving radio network controller (SRNC);
   a drift radio network controller (DRNC);
   wherein the serving radio network controller (SRNC) executes a process to assign radio resources to be allocated by the drift radio network controller (DRNC) to a connection with a user equipment unit (UE) after a channel switch operation, the connection being with a user equipment unit (UE);
   wherein the serving radio network controller (SRNC) supplies the user equipment unit (UE) with information regarding the assigned radio resources; and
   wherein the serving radio network controller (SRNC) requests the information regarding the radio resources as part of a Common Transport Channel Resources Initialization procedure.

26. The apparatus of claim 25, wherein the formation regarding the radio resources specifies a particular cell to be utilized by the connection with the user equipment unit (UE) after the channel switch operation.

27. The apparatus of claim 25, wherein the information regarding the radio resources comprises specific channel(s) to be utilized by the connection with the user equipment unit (UE) after the channel switch operation.

28. The apparatus of claim 25, wherein the serving radio network controller (SRNC) requests the information regarding the radio resources as part of a channel switching process when a determination has been made that a channel switch should occur.

29. A radio access network comprising:

a serving radio network controller (SRNC);

a drift radio network controller (DRNC);

wherein the serving radio network controller (SRNC) executes a process to assign radio resources to be allocated by the drift radio network controller (DRNC) to a connection with a user equipment unit (UE) after a channel switch operation, the connection being with a user equipment unit (UE);

wherein the serving radio network controller (SRNC) supplies the user equipment unit (UE) with information regarding the assigned radio resources; and wherein the channel switch is from a dedicated channel to a common channel.

30. The apparatus of claim 29, wherein the information regarding the radio resources comprises specific channel(s) to be utilized by the connection with the user equipment unit (UE) after the channel switch operation.

31. The apparatus of claim 29, wherein the information regarding the radio resources specifies a particular cell to be utilized by the connection with the user equipment unit (UE) after the channel switch operation.

32. The apparatus of claim 29, wherein the serving radio network controller (SRNC) requests the information regarding the radio resources as part of a channel switching process when a determination has been made that a channel switch should occur.

* * * * *